United States Patent
Liu et al.

(10) Patent No.: US 11,197,361 B1
(45) Date of Patent: Dec. 7, 2021

(54) SPLIT-TYPE IN-WALL SMART SWITCH MODULE

(71) Applicant: FOCALCREST LIMITED, Shenzhen (CN)

(72) Inventors: Zhenyu Liu, Shenzhen (CN); Shanghua Xie, Shenzhen (CN)

(73) Assignee: FOCALCREST LIMITED, Shenzhen (CN)

( * ) Notice: Subject to any disclaimer, the term of this patent is extended or adjusted under 35 U.S.C. 154(b) by 0 days.

(21) Appl. No.: 16/942,799

(22) Filed: Jul. 30, 2020

(30) Foreign Application Priority Data

Jun. 2, 2020 (CN) .......................... 202010489190.3

(51) Int. Cl.
*H05B 47/19* (2020.01)
*H05B 45/37* (2020.01)
*H01R 13/74* (2006.01)
*H02G 3/12* (2006.01)
*H05B 47/17* (2020.01)

(52) U.S. Cl.
CPC ............. *H05B 47/19* (2020.01); *H01R 13/74* (2013.01); *H02G 3/121* (2013.01); *H05B 47/17* (2020.01)

(58) Field of Classification Search
CPC .... H05B 45/37; H05B 45/375; H05B 45/382; H05B 47/10; H05B 47/19; H05B 47/17; H05B 47/175
See application file for complete search history.

(56) References Cited

U.S. PATENT DOCUMENTS

| | | | | |
|---|---|---|---|---|
| 6,906,477 B2* | 6/2005 | Kazanov | ............... | H05B 39/048 315/224 |
| 6,933,686 B1* | 8/2005 | Bishel | .................. | G04G 15/006 315/293 |
| 8,892,913 B2* | 11/2014 | Newman, Jr. | ........ | H05B 39/048 713/300 |
| 9,380,685 B2* | 6/2016 | Shet | ....................... | H05B 47/19 |
| 10,667,358 B1* | 5/2020 | Marx | ................... | H05B 47/185 |
| 2007/0126366 A1* | 6/2007 | Frid | ....................... | H05B 39/04 315/209 R |
| 2010/0145545 A1* | 6/2010 | Mosebrook | ............ | H05B 39/08 700/297 |
| 2011/0012528 A1* | 1/2011 | Tsui | .................... | H05B 41/3924 315/291 |
| 2012/0063186 A1* | 3/2012 | Tsui | ....................... | H05B 39/08 363/126 |
| 2015/0048753 A1* | 2/2015 | Chen | ....................... | H05B 47/10 315/250 |

* cited by examiner

*Primary Examiner* — Thai Pham

(57) ABSTRACT

A split-type in-wall smart switch module comprises a switching signal generation unit, a mechanical switch, a switching signal receiving and processing unit, a wireless module unit, a switching unit and a load, wherein the switching signal generation unit is connected to a live wire in mains electricity, the mechanical switch and the switching signal receiving and processing unit, respectively; the switching signal receiving and processing unit is also connected to the wireless module unit and a neutral wire in mains electricity respectively; the other end of the wireless module unit is connected to the switching unit; the other end of the switching unit is connected to the load; and the other end of the load is connected to the neutral wire in mains electricity. The switch can realize the control of turning-on and turning-off by means of a switch panel.

9 Claims, 13 Drawing Sheets

SPLIT-TYPE IN-WALL SMART SWITCH MODULE

CROSS REFERENCE OF RELATED APPLICATION

This application claims the benefit of Chinese Patent Application No. 202010489190.3, having the title of "Split-type In-wall Smart Switch Module", filed on Jun. 2, 2020, the contents of which are incorporated herein by reference.

TECHNICAL FIELD

The present invention is a solution and relates to the technical field of smart switches, and in particular to in-wall smart switch modules.

BACKGROUND ART

In-wall switches mainly refer to switches mounted on switch boxes which can control electrical appliances such as lamps or sockets.

Currently, in-wall switches on the market include mechanical switches and smart switches. The smart switches may further be classified as single-wire smart switches without neutral wire and two-wire (a live wire and a neutral wire) smart switches. Generally, the smart switch can be turned on and turned off not only by manually pressing a switch panel, but also in a remote and wireless manner, or through a network. At present, most of products are the single wire smart switches without neutral wire. Due to the general indoor grid wiring with only a live wire but no neutral wire within a switch box, the two-wire smart switches are hardly popularized. At present, the common problems of single-wire smart switches without neutral wire are electricity leakage, flicker, over-sized control units, etc. Switch boxes in different countries around the world are different in size, and some small-sized switch boxes cannot house smart switch control units at all.

SUMMARY OF THE INVENTION

In order to overcome the above-mentioned disadvantages of the prior art, the present invention provides a split-type in-wall smart switch module, which solves the technical problems mentioned above.

The technical solution adopted by the present invention to solve the problems in the prior art is a split-type in-wall smart switch module, which comprises a switching signal generation unit, a mechanical switch, a switching signal receiving and processing unit, a wireless module unit, a switching unit and a load, wherein the switching signal generation unit is connected to a live wire in mains electricity, the mechanical switch and the switching signal receiving and processing unit, respectively; the switching signal receiving and processing unit is also connected to the wireless module unit and a neutral wire in mains electricity, respectively; the other end of the wireless module unit is connected to the switching unit; the other end of the switching unit is connected to the load; and the other end of the load is connected to the neutral wire in mains electricity.

As a preferred solution of the present invention, the switching signal generation unit comprises a bidirectional thyristor, a gate electrode circuit, a rectifier and filter circuit, a DC-DC buck circuit, an optocoupler isolation circuit, an optocoupler relay and a delay circuit, wherein an input end of the bidirectional thyristor is connected to the live wire in mains electricity, and the control end of the bidirectional thyristor is connected to the gate electrode circuit; the gate electrode circuit is also connected to the rectifier and filter circuit and the optocoupler isolation circuit respectively; the rectifier and filter circuit is connected to the DC-DC buck circuit; the DC-DC buck circuit is connected to the mechanical switch, the delay circuit and an optocoupler circuit, respectively; an output end of the mechanical switch is connected to the delay circuit; an output end of the delay circuit is connected to the optocoupler circuit; and an output end of the optocoupler circuit is connected to the optocoupler isolation circuit.

As a preferred solution of the present invention, the split-type in-wall smart switch module further comprises a switching indicator circuit, wherein the switching indicator circuit is connected to the DC-DC buck circuit and the output end of the mechanical switch.

As a preferred solution of the present invention, the switching signal receiving and processing unit comprises a switching signal detection circuit and an AC-DC circuit; the wireless module unit comprises a wireless communication circuit and an LED indicator circuit, and the switching unit comprises a relay circuit and a relay drive circuit, wherein the switching signal detection circuit is connected to an output end of the switching signal generation unit, the neutral wire in mains electricity and the wireless communication circuit respectively; the AC-DC circuit and the relay circuit are also connected to the output end of the switching signal generation unit and the neutral wire in mains electricity; one end of the load is connected to the relay circuit, and the other end of the load is connected to the neutral wire in mains electricity; the AC-DC circuit is connected to the switching signal detection circuit, the relay drive circuit and the LED indicator circuit, respectively; the wireless communication circuit is connected to the LED indicator circuit and the relay drive circuit, respectively; and the relay drive circuit is connected to and controls the relay circuit.

As a preferred solution of the present invention, the switching signal generation unit and the mechanical switch are arranged in an electrical box under a switch panel, and the switching signal receiving and processing unit, the wireless module unit and the switching unit are arranged at the load.

As a preferred solution of the present invention, the optocoupler isolation circuit comprises a diode 1D1, a diode 1D2, a diode 1Z1, a diode 1Z2, an MOS optocoupler 1U2 and an MOS optocoupler 1U8, wherein the diode 1D1 and diode 1D2 constitute a rectifier circuit while the MOS optocoupler 1U2 and the MOS optocoupler 1U8 are connected to the rectifier circuit and a voltage stabilizer circuit.

As a preferred solution of the present invention, the optocoupler relay circuit comprises a switching tube 1Q2 and a switching tube 1Q4, wherein the switching tube 1Q2 controls and drives the MOS optocoupler 1U2 while the switching tube 1Q4 controls and drives the MOS optocoupler 1U8.

As a preferred solution of the present invention, the delay circuit comprises a diode 1D3, a diode 1D5, a diode 1D6, a resistor 1R2, a resistor 1R4, a resistor 1R5, a capacitor 1C1 and a capacitor 1C2, wherein one end of each of the diode 1D3, the resistor 1R2 and the capacitor 1C1 is connected to the G electrode of the switching tube 1Q2, and the other end of each of the diode 1D3 and the resistor 1R2 is connected to the S electrode of the switching tube 1Q2; one end of each of the diode 1D5, the resistor 1R5 and the capacitor 1C2 is connected to the G electrode of the switching tube 1Q4, and the other end of each of the diode 1D5 and the resistor 1R5 is connected to the S electrode of the switching tube 1Q4; and the other end of each of the capacitor 1C1 and the capacitor 1C2 is connected to the diode 1D6 and the resistor 1R4.

As a preferred solution of the present invention, the switching signal detection circuit comprises a live wire switching signal detection circuit and a neutral wire switching signal detection circuit which are identical in circuit layout, the live wire switching signal detection circuit comprising a rectifier circuit, a voltage divider circuit, a voltage stabilizer circuit and a comparison circuit, wherein an input end of the comparison circuit is connected to the rectifier circuit, the voltage divider circuit, and the voltage stabilizer circuit, respectively, and an output end of the comparison circuit is connected to the wireless communication circuit.

As a preferred solution of the present invention, the AC-DC circuit comprises a front-stage rectifier and filter circuit, a first-stage buck circuit and a second-stage buck circuit, wherein the front-stage rectifier and filter circuit is connected to the first-stage buck circuit, while the first-stage buck circuit is connected to the switching signal detection circuit, the second-stage buck circuit and the relay drive circuit; and the second-stage buck circuit is connected to the wireless communication circuit.

Compared with the prior art, the present invention has the following technical effects:
The split-type in-wall smart switch module of the present application, separating the switch panel signal generation side from the switching signal receiving and control side, that is, the switching signal generation unit and the mechanical switch in this solution are arranged in the electrical box under the switch panel, and the switching signal receiving and processing unit, the wireless module unit and the switching unit are arranged at the load, can realize the small size of a signal generation circuit at the switch panel side, so that the split-type in-wall smart switch module can be compatible with electrical boxes of different sizes in different countries around the world; moreover, the switching signal receiving and control side receives a switching signal first before controlling a bulb, which can realize complete isolation and avoid the problem of electricity leakage, and in this scenario, an electric appliance such as a bulb is completely turned off when power is off, so no matter how small the power of the bulb is, there will be no flicker phenomenon etc.; more importantly, the split-type in-wall smart switch module in this solution not only can realize the control of turning-on and turning-off by means of the switch panel, but also can realize remote turning-on and turning-off in a wireless manner. The split-type in-wall smart switch module can be turned on and turned off remotely after being turned off by switch panel, and it also can be turned on and turned off by the switch panel after being turned off remotely.

Figure 1:
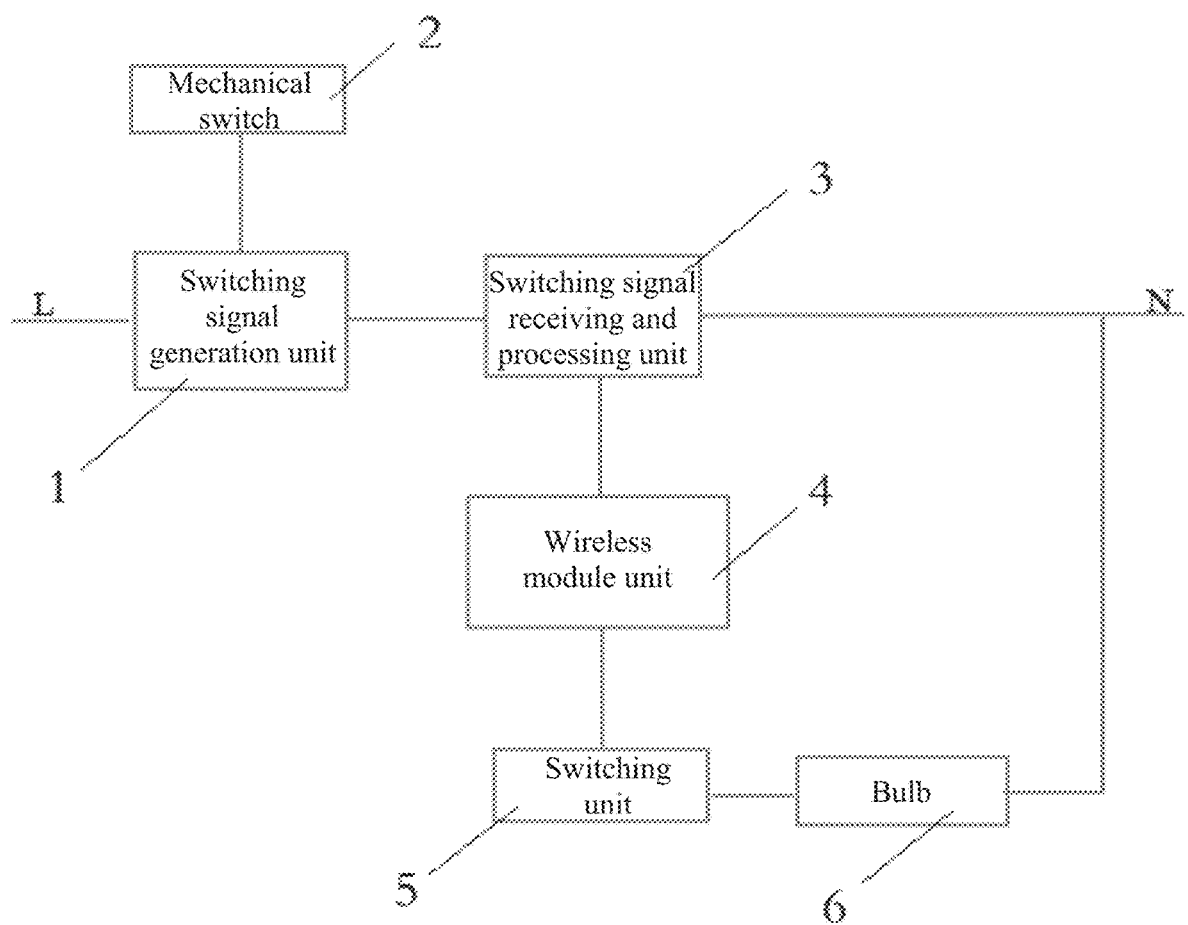
FIG. 1 is a principle block diagram of a split-type in-wall smart switch module according to the present invention.

Reference numerals in the drawings: 1. Switching signal generation unit; 2. Mechanical switch; 3. Switching signal receiving and processing unit; 4. Wireless module unit; 5. Switching unit; 6. Load; 11. Bidirectional thyristor; 12. Gate electrode circuit; 13. Rectifier and filter circuit; 14. DC-DC buck circuit; 15. Optocoupler isolation circuit; 16. Optocoupler relay circuit; 17. Delay circuit; 18. Switching indicator circuit; 31. Switching signal detection circuit; 32. AC-DC circuit; 41. Wireless communication circuit; 42. LED indicator circuit; 51. Relay circuit; 52. Relay drive circuit.

DETAILED DESCRIPTION OF EMBODIMENTS

Specific embodiments of the present invention will be further described below in conjunction with the drawings. It should be noted here that the description of the embodiments is intended to help understand the present invention, but does not constitute a limitation to the present invention. In addition, the technical features involved in the embodiments of the present invention as described below can be combined with each other so long as they do not constitute conflicts with each other.

As shown in FIG. 1: a split-type in-wall smart switch module comprises a switching signal generation unit 1, a mechanical switch 2, a switching signal receiving and processing unit 3, a wireless module unit 4, a switching unit 5 and a load 6, wherein the switching signal generation unit 1 is connected to a live wire in mains electricity, the mechanical switch 2 and the switching signal receiving and processing unit 3, respectively; the switching signal receiving and processing unit 3 is also connected to the wireless module unit 4 and a neutral wire in mains electricity, respectively; the other end of the wireless module unit 4 is connected to the switching unit 5; the other end of the switching unit 5 is connected to the load 6; and the other end of the load 6 is connected to the neutral wire in mains electricity.

Figure 2:
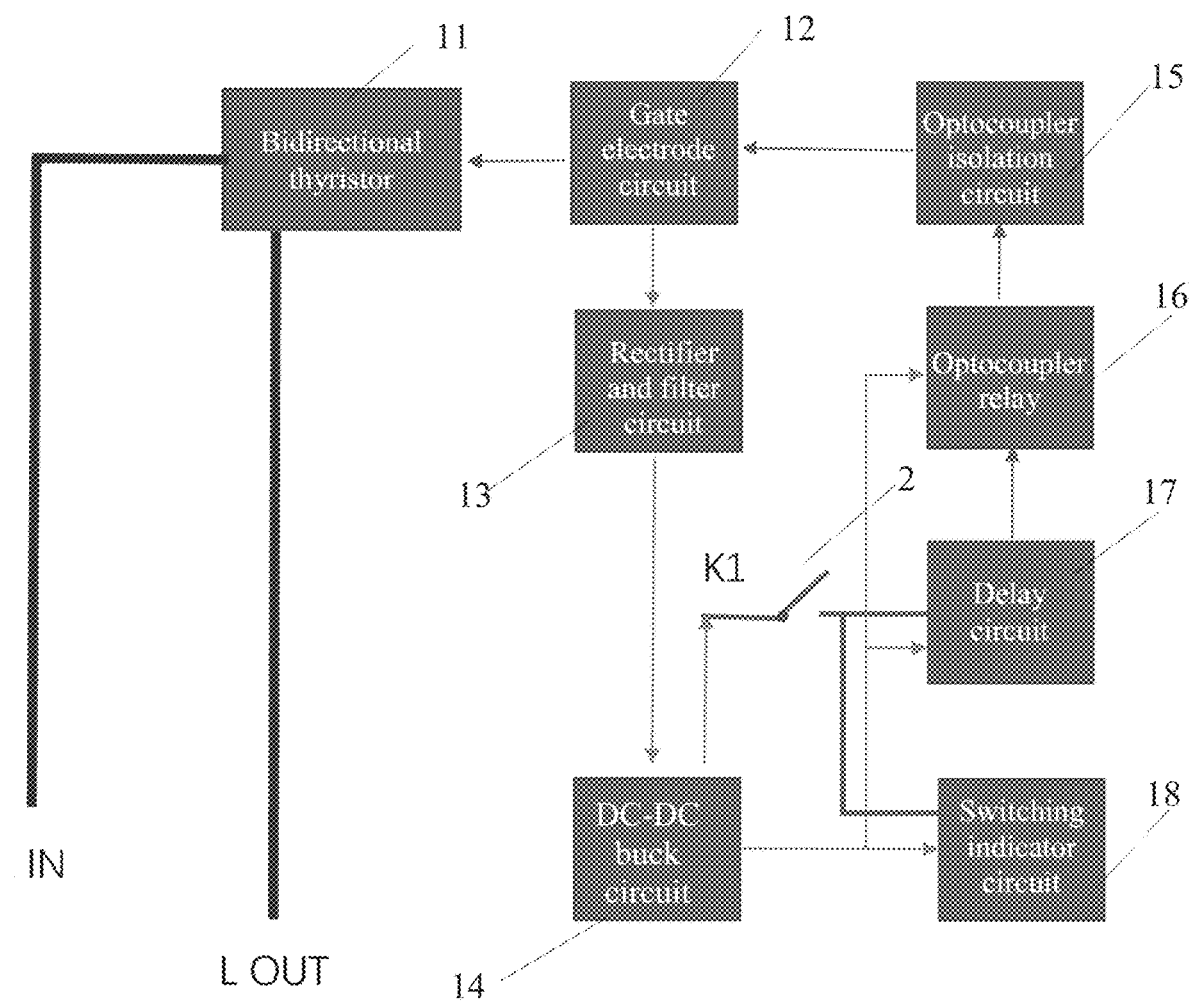
FIG. 2 is a principle block diagram of a switching signal generation unit in a split-type in-wall smart switch module according to the present invention.
Figure 3:
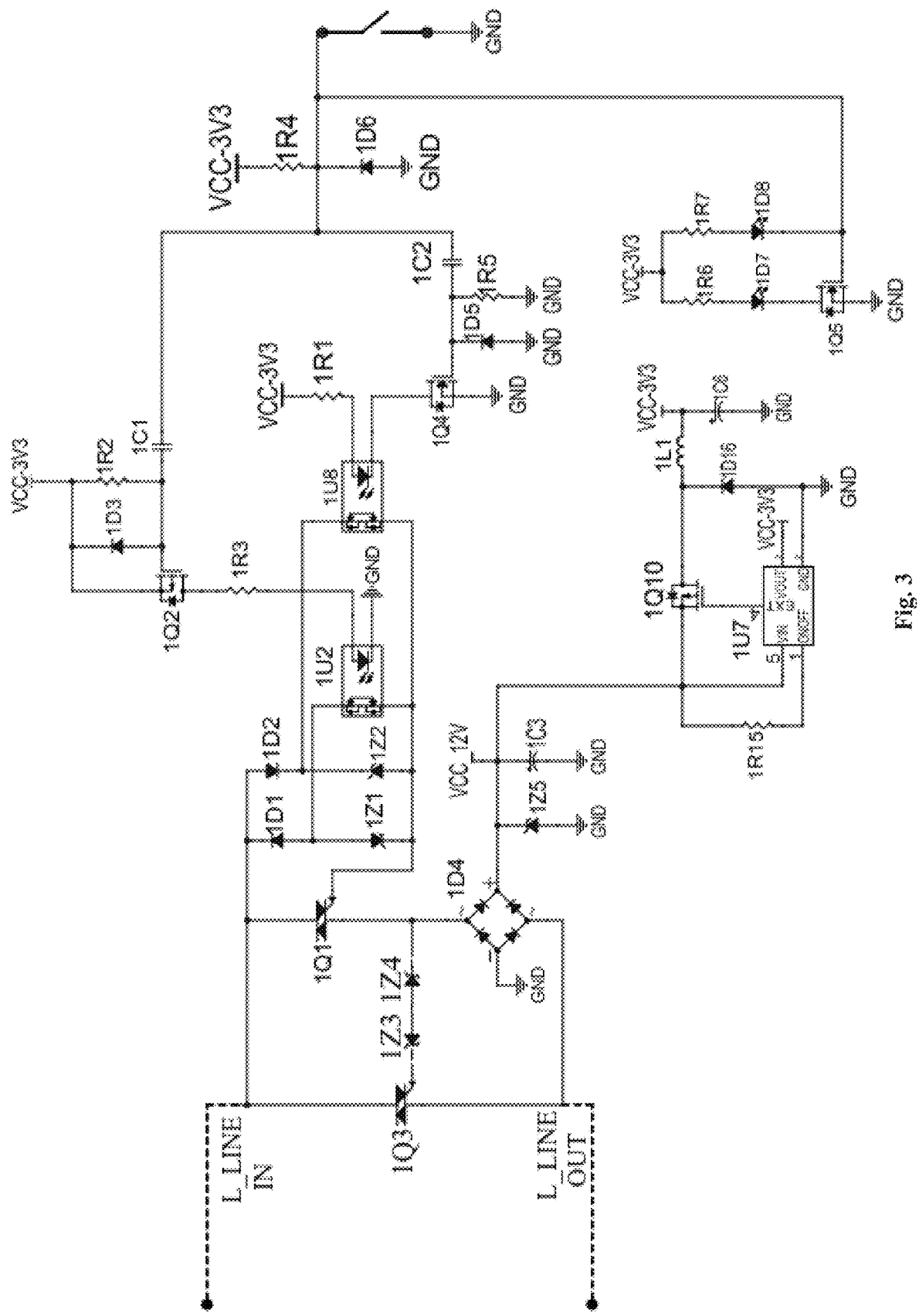
FIG. 3 is a circuit principle diagram of a switching signal generation unit in a split-type in-wall smart switch module according to the present invention.

As shown in FIGS. 2 and 3: further, the switching signal generation unit 1 comprises a bidirectional thyristor 11, a gate electrode circuit 12, a rectifier and filter circuit 13, a DC-DC buck circuit 14, an optocoupler isolation circuit 15, an optocoupler relay, a delay circuit 17 and a mechanical switch 2, wherein L IN represents an input of a live wire in mains electricity, and L OUT represents an output obtained by taking power through a switching signal generator.

Specifically, an input end of the bidirectional thyristor 11 is connected to the live wire in mains electricity, and the control end of the bidirectional thyristor 11 is connected to the gate electrode circuit 12; the gate electrode circuit 12 is also connected to the rectifier and filter circuit 13 and the optocoupler isolation circuit 15, respectively; the rectifier and filter circuit 13 is connected to the DC-DC buck circuit 14; the DC-DC buck circuit 14 is connected to the mechanical switch 2, the delay circuit 17 and an optocoupler circuit, respectively; an output end of the mechanical switch 2 is connected to the delay circuit 17; an output end of the delay circuit 17 is connected to the optocoupler circuit; and an output end of the optocoupler circuit is connected to the optocoupler isolation circuit 15. Further, the split-type in-wall smart switch module also comprises a switching indicator circuit 18, wherein the switching indicator circuit is connected to the DC-DC buck circuit 14 and the output end of the mechanical switch 2.

In the switching signal generator, the bidirectional thyristor 11 is a front-end switching device for taking power at a low voltage, which intercepts parts of low voltages not exceeding 12 V within each sine wave period. The bidirectional thyristor 11 is turned off when the voltage across it is lower than 12 V, and is turned on when said voltage is higher than 12 V.

The intercepted voltage is taken out from the gate electrode circuit 12 for the bidirectional thyristor 11, and the gate electrode circuit 12 controls the bidirectional thyristor 11 to be turned off when the voltage on the L IN wire is below 12 V and to be turned on when it is above 12 V. When the bidirectional thyristor is turned off, power is taken for use by a circuit at the subsequent stage, and when the bidirectional thyristor is turned on, no power is taken.

After the taken-out voltage goes through the rectifier and filter circuit 13, AC power is converted into DC power, which is then supplied to the DC-DC buck circuit 14. The DC-DC buck circuit 14 drops the voltage of the input fluctuating DC power and stably outputs 3.3 V to the switching indicator circuit, the delay circuit 17, and the optocoupler relay circuit 16.

When each part is supplied with power normally, the switching indicator circuit can indicate a switching state when the mechanical switch 2K1 is pressed, meanwhile, a switching signal goes through the delay circuit 17 and then output to the optocoupler relay circuit 16. The optocoupler relay circuit 16 finally drives the optocoupler isolation circuit 15 to, in turn, control the gate electrode circuit 12, and the gate electrode circuit 12 then controls the bidirectional thyristor 11 to be turned on or turned off, thereby generating a switching signal and outputting same to the load 6 at the next stage. The whole process involves a self-adaptive, self-powered, and self-circulation closed-loop control system.

One switching signal is generated only at the moment when the switch is pressed, and multiple signals will not be generated when K1 is continuously pressed. This can prevent the load 6 at the subsequent stage from being affected because the switching time is too long.

Figure 4:
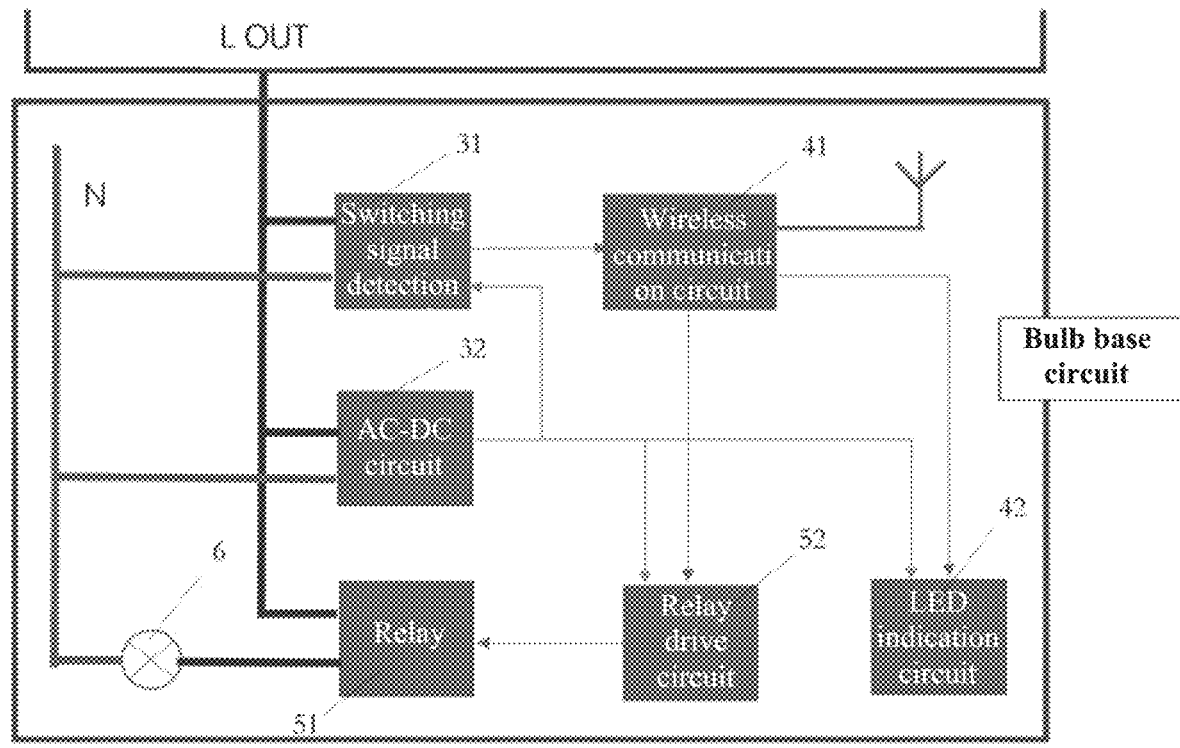
FIG. 4 is a principle block diagram of circuits arranged at a load in a split-type in-wall smart switch module according to the present invention.

As shown in FIG. 4, further, the switching signal receiving and processing unit 3 comprises a switching signal detection circuit 31 and an AC32-DC14 circuit, the wireless module unit 4 comprises a wireless communication circuit 41 and an LED indicator circuit 42, and the switching unit 5 comprises a relay circuit 51 and a relay drive circuit 52, wherein the switching signal detection circuit 31 is connected to an output end L OUT of the switching signal generation unit 1, the neutral wire N in mains electricity and the wireless communication circuit 41 respectively; the AC32-DC14 circuit and the relay circuit 51 are also connected to the output end of the switching signal generation unit 1 and the neutral wire in mains electricity; one end of the load 6 is connected to the relay circuit 51, and the other end of the load 6 is connected to the neutral wire in mains electricity; the AC32-DC14 circuit is connected to the switching signal detection circuit 31, the relay drive circuit 52 and the LED indicator circuit 42, respectively; the wireless communication circuit 41 is connected to the LED indicator circuit 42 and the relay drive circuit 52, respectively; the relay drive circuit is connected to and controls the relay circuit 51 which in turn controls the turning-on and turning-off of the load 6; the load 6 comprises but isn't limited to various types of bulbs, such as an incandescent lamp, a halogen lamp, a fluorescent lamp, an LED lamp, a metal halide lamp, a sodium lamp, and a mercury lamp.

Figure 5:
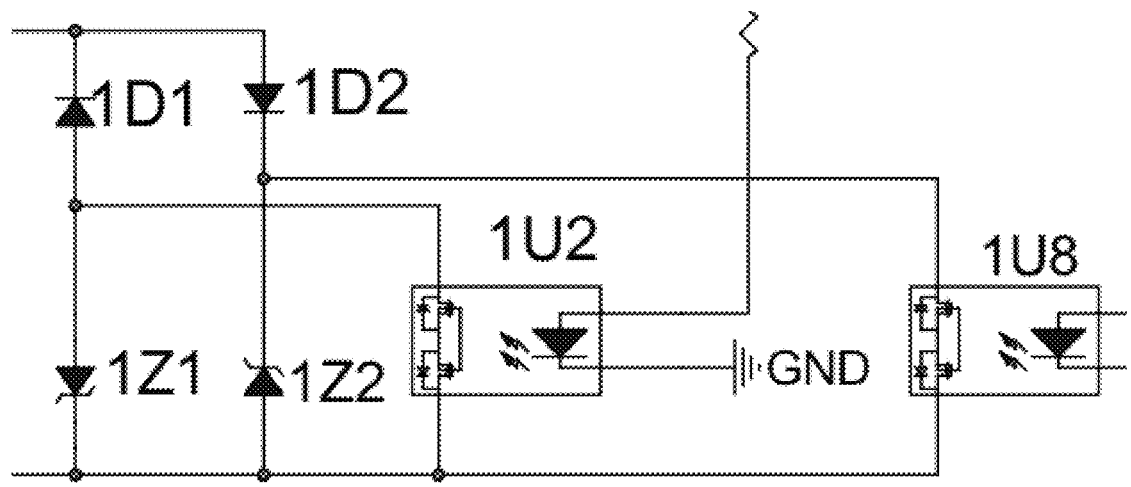
FIG. 5 is a circuit principle diagram of an optocoupler isolation circuit in a split-type in-wall smart switch module according to the present invention.

Specifically, as shown in FIG. 5: the optocoupler isolation circuit 15 comprises a diode 1D1, a diode 1D2, a diode 1Z1, a diode 1Z2, an MOS optocoupler 1U2 and an MOS optocoupler 1U8, wherein the diode 1D1 and the diode 1D2 constitute a rectifier circuit, and the MOS optocoupler 1U2 and the MOS optocoupler 1U8 are connected to the rectifier circuit and a voltage stabilizer circuit to prevent the MOS optocoupler 1U2 and the MOS optocoupler 1U8 from overvoltage.

In this embodiment, the MOS optocoupler 1U2 and the MOS optocoupler 1U8 are normally-closed MOS optocouplers. This realizes the control of ON and OFF of a high voltage signal at a low voltage. The ordinary state of the adopted normally-closed optocoupler is ON when no switching signal is generated, therefore no electric energy needs to be consumed. Moreover, since the ordinary state is ON, whether the load 6 is at an ON or OFF state, the operating of the load 6 will not be affected. This can greatly reduce the standby power consumption of the product.

Figure 6:
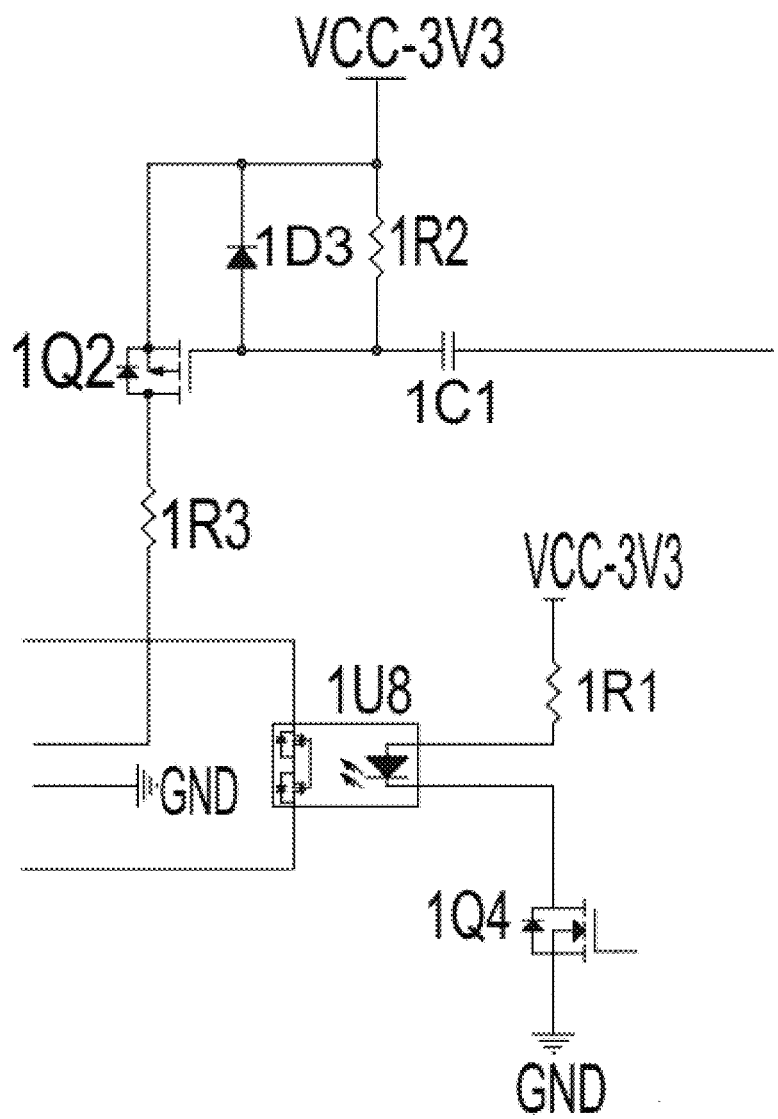
FIG. 6 is a circuit principle diagram of an optocoupler relay circuit in a split-type in-wall smart switch module according to the present invention.

Specifically, as shown in FIG. 6: the optocoupler relay circuit 16 comprises a switching tube 1Q2 and a switching tube 1Q4, wherein the switching tube 1Q2 controls and drives the MOS optocoupler 1U2, and the switching tube 1Q4 controls and drives the MOS optocoupler 1U8. In addition, in order to prevent the MOS optocoupler 1U2 and the MOS optocoupler 1U8 from being damaged, the MOS optocoupler 1U2 and the MOS optocoupler 1U8 are respectively connected to a drive current-limiting resistor 1R3 and a drive current-limiting resistor 1R1.

Figure 7:
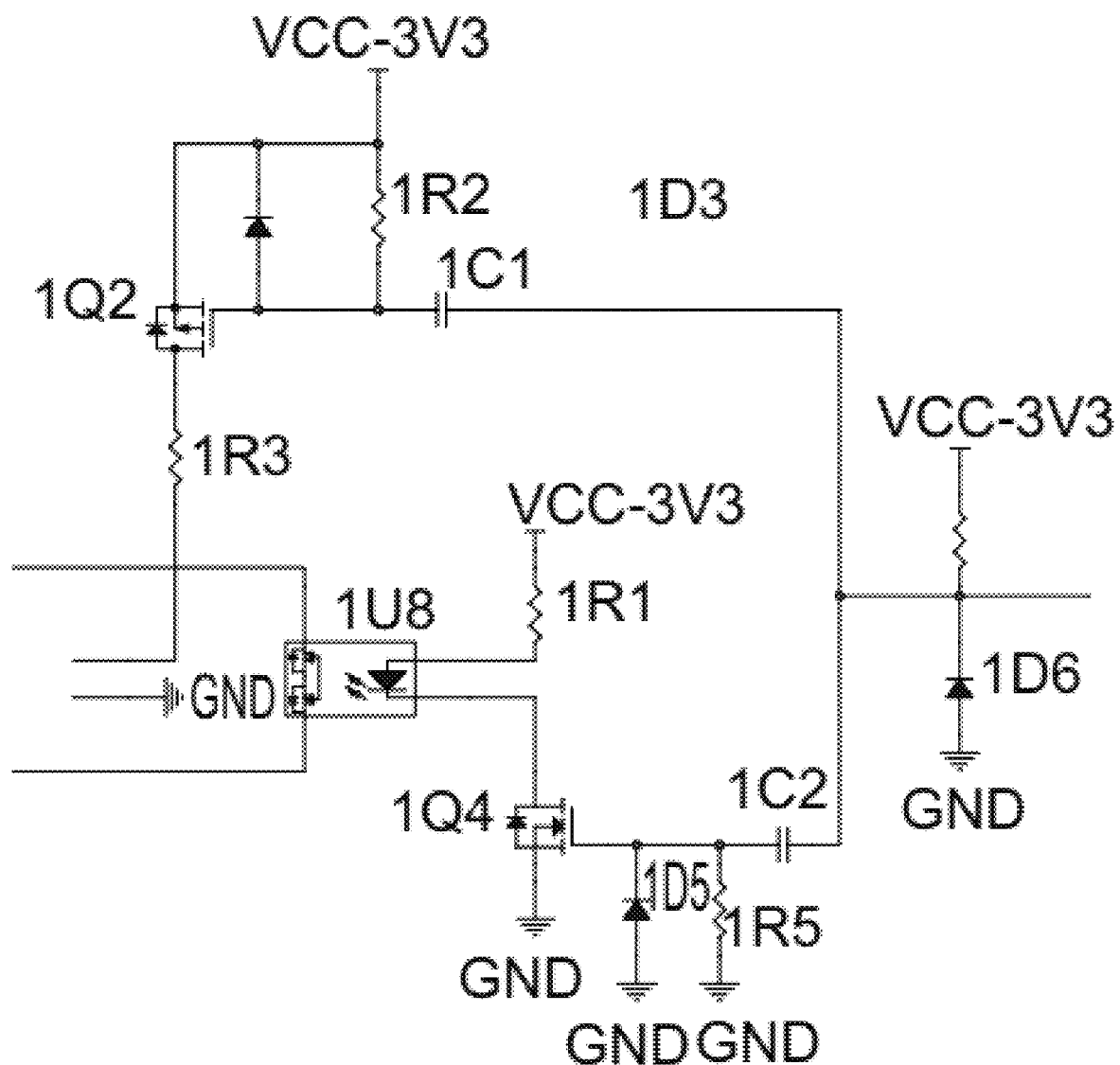
FIG. 7 is a circuit principle diagram of a delay circuit in a split-type in-wall smart switch module according to the present invention.

Specifically, as shown in FIG. 7: the delay circuit 17 comprises a diode 1D3, a diode 1D5, a diode 1D6, a resistor 1R2, a resistor 1R4, a resistor 1R5, a capacitor 1C1 and a capacitor 1C2 to constitute a resistor-capacitor delay circuit 177 for extending the duration of the switching signal. One end of each of the diode 1D3, the resistor 1R2 and the capacitor 1C1 is connected to a G electrode of the switching tube 1Q2, and the other end of each of the diode 1D3 and the resistor 1R2 is connected to an S electrode of the switching tube 1Q2; one end of each of the diode 1D5, the resistor 1R5 and the capacitor 1C2 is connected to a G electrode of the switching tube 1Q4, and the other end of each of the diode 1D5 and the resistor 1R5 is connected to an S electrode of the switching tube 1Q4; and the other end of each of the capacitor 1C1 and the capacitor 1C2 is connected to the diode 1D6 and the resistor 1R4.

Figure 8:
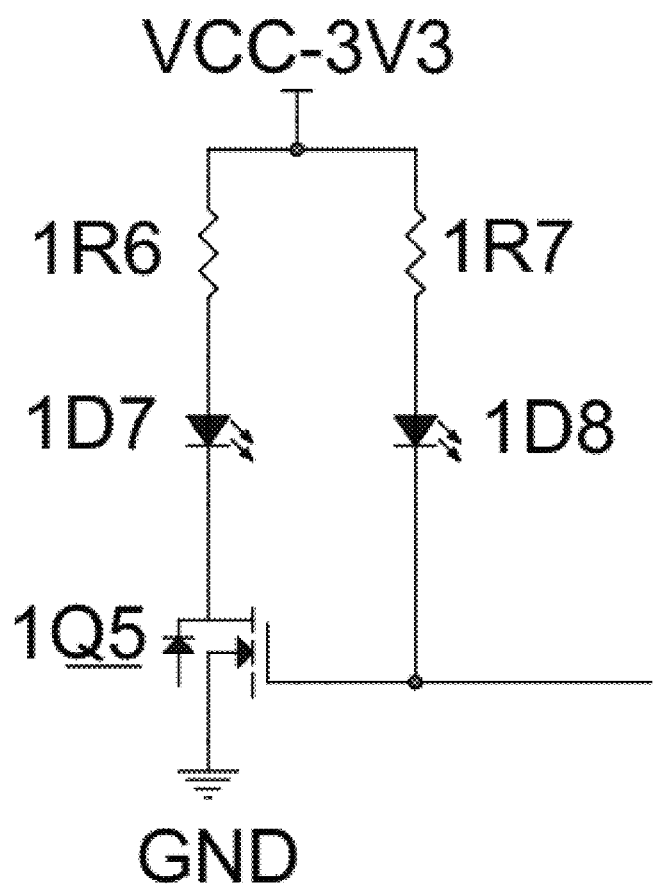
FIG. 8 is a circuit principle diagram of a switching indicator circuit in a split-type in-wall smart switch module according to the present invention.

Specifically, as shown in FIG. 8: the switching indicator circuit 18 comprises a switching tube 1Q5, a resistor 1R6, a resistor 1R7, a diode 1D7 and a diode 1D8, and indicates, as an LED indicator, the switching state of the mechanical switch 28.

Figure 9:
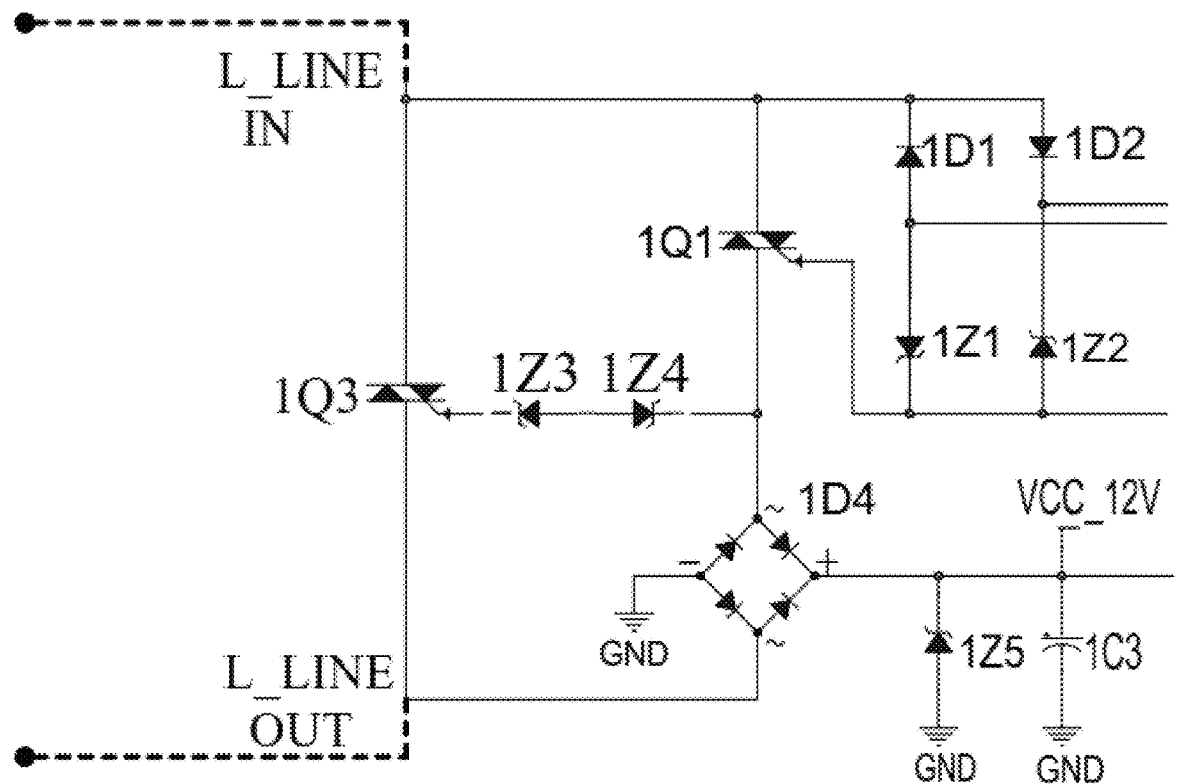
FIG. 9 is a circuit principle diagram of a gate electrode circuit and a rectifier and filter circuit in a split-type in-wall smart switch module according to the present invention.

Specifically, as shown in FIG. 9: the bidirectional thyristor 111 for controlling the turning-on and turning-off of the mains supply is a bidirectional thyristor 111Q3; a diode 1Z3, a diode 1Z4 and a bidirectional thyristor 111Q1 constitute a gate electrode circuit 122; and a diode 1D4, a diode 1Z5 and a capacitor 1C3 constitute a rectifier and filter circuit 133, which has functions of rectification, voltage stabilization and filtering.

Figure 10:
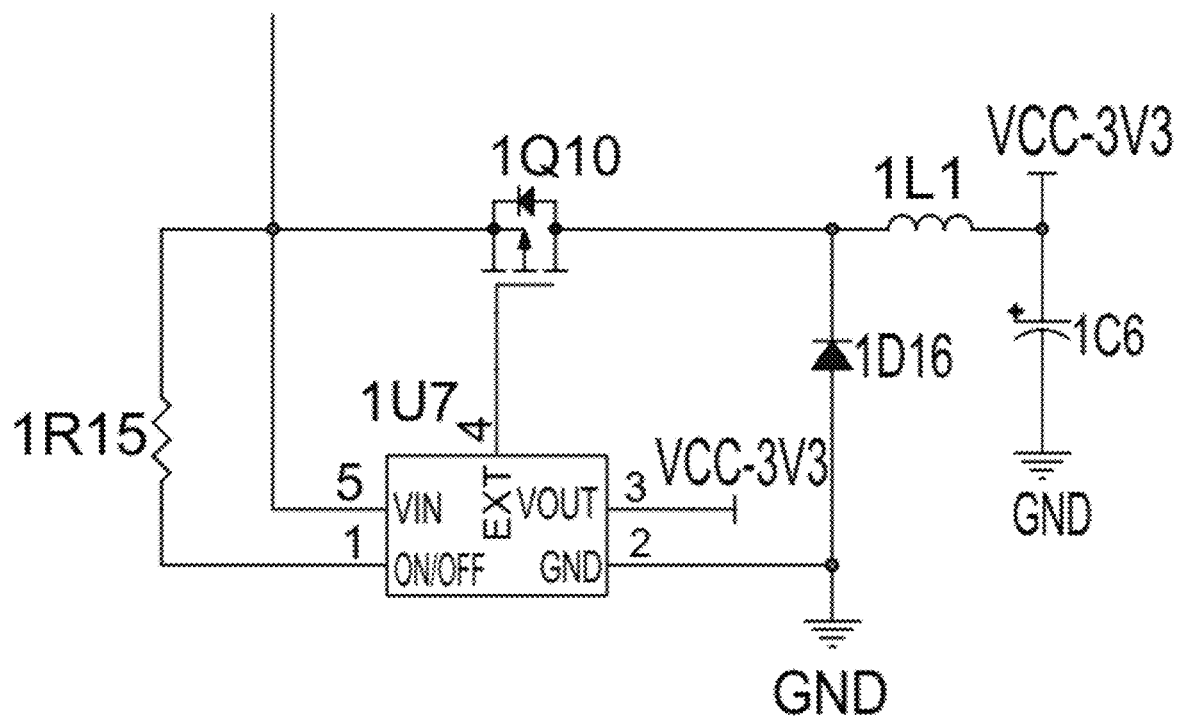
FIG. 10 is a circuit principle diagram of a DC-DC buck circuit in a split-type in-wall smart switch module according to the present invention.

Specifically, as shown in FIG. 10: the DC-DC buck circuit 14 comprises a buck chip 1U7, a resistor 1R15, a switching tube 1Q10, a diode 1D16, an inductor 1L1 and a capacitor 1C6 to constitute a switching power supply circuit for further dropping the voltage at the previous stage to 3.3 V for use by the subsequent stage. The buck chip is connected to the resistor 1R15, the switching tube 1Q10 and the diode 1D16, respectively; a D electrode of the switching tube 1Q10 and a cathode of the diode 1D16 are connected to the inductor 1L1; and the other end of the inductor 1L1 is connected to the capacitor 1C6.

Figure 11:
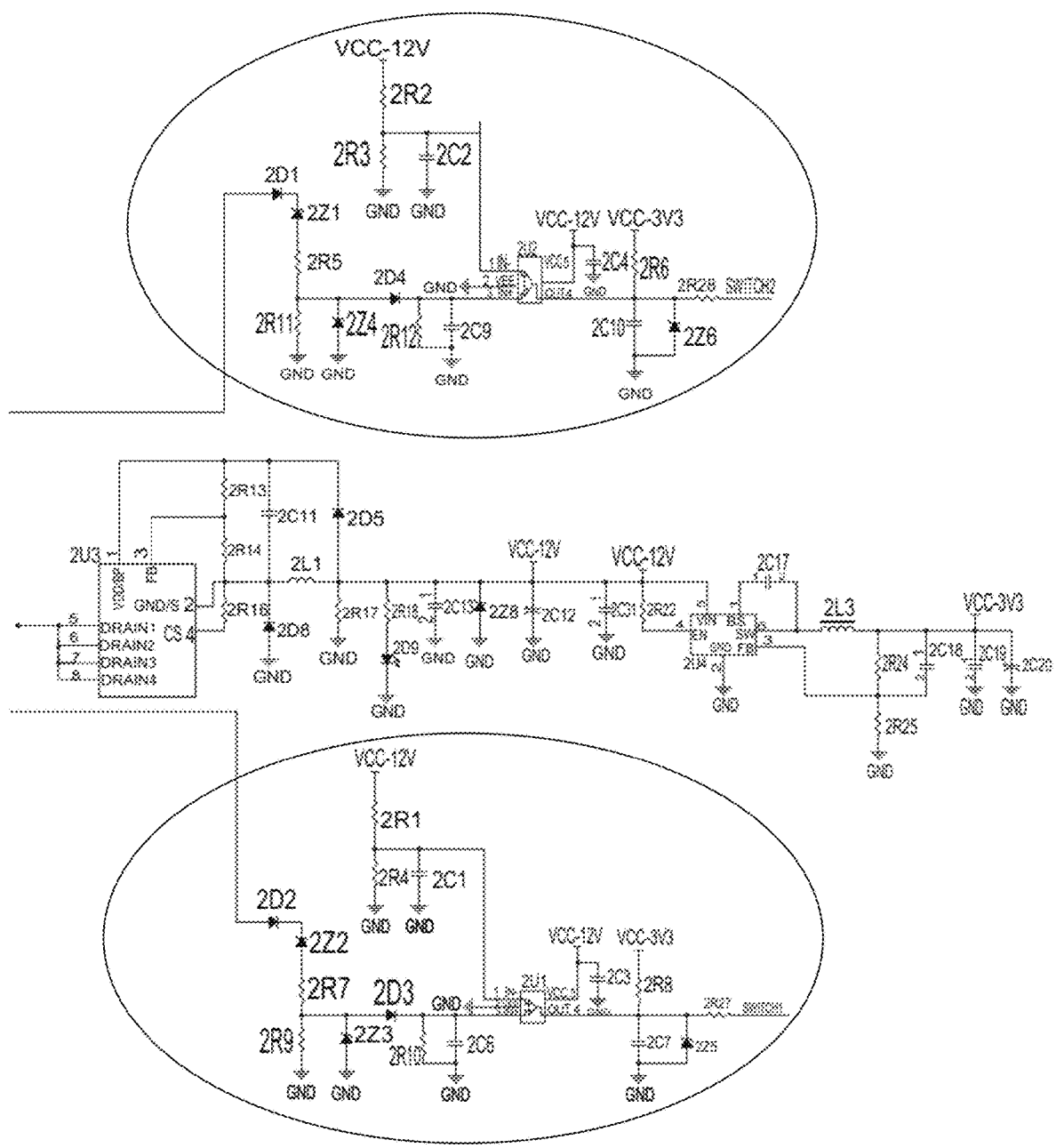
FIG. 11 is a circuit principle diagram of a switching signal detection circuit in a split-type in-wall smart switch module according to the present invention.
Figure 12:
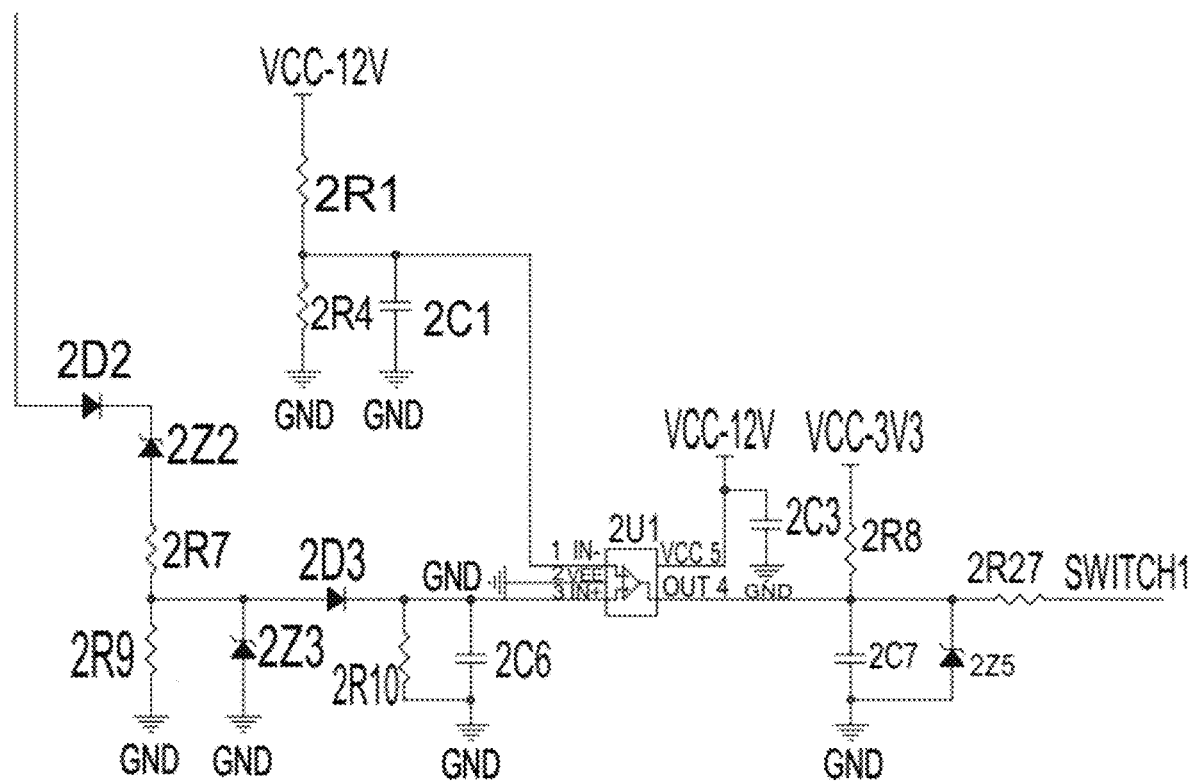
FIG. 12 is a circuit principle diagram of a live wire switching signal detection circuit in a split-type in-wall smart switch module according to the present invention.

As shown in FIGS. 11 and 12: Specifically, the switching signal detection circuit 31 comprises a live wire switching signal detection circuit 31 and a neutral wire switching signal detection circuit 31 which are identical in circuit layout, wherein the live wire switching signal detection circuit 31 comprises a rectifier circuit, a voltage divider circuit, and a voltage stabilizer circuit, which is composed of a diode 2D2, a diode 2D3, a diode 2Z2, a diode 2Z3, a resistor R7 and a resistor R9, and the rectifier circuit, dropping the mains high voltage to a low one.

In addition, the live wire switching signal detection circuit 31 further comprises a comparison circuit composed of a resistor 2R1, a resistor 2R4, a capacitor 2C1, a resistor 2R10, a capacitor 2C6, a detection chip 2U1, a resistor 2R8, a capacitor 2C7, a diode 2Z5 and a resistor 2R27, wherein an input end of the comparison circuit is respectively connected to the rectifier circuit, the voltage divider circuit and the voltage stabilizer circuit while an output end of the comparison circuit is connected to the wireless communication circuit 41, therefor a switching signal can be detected from a mains line and output to SWTCH1. The SWTCH1 is connected to an I/O port of a wireless module controller connected to the wireless communication circuit 41. The detection chip 2U1 is also connected to a capacitor 2C3, and the capacitor 2C3 filters the power supply for the detection chip 2U1.

Figure 13:
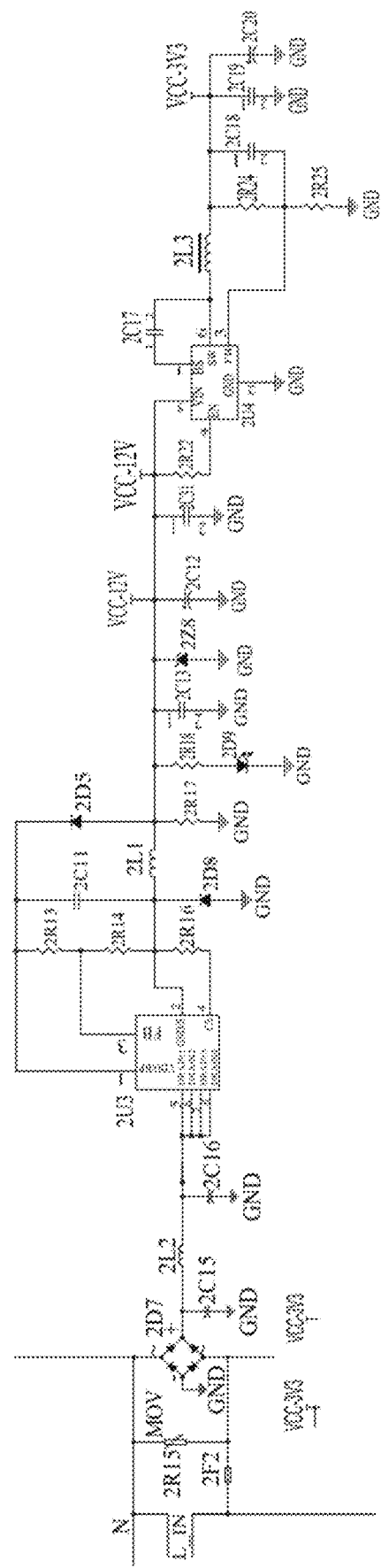
FIG. 13 is a circuit principle diagram of an AC-DC circuit in a split-type in-wall smart switch module according to the present invention.

As shown in FIG. 13: further, the AC32-DC14 circuit comprises a front-stage rectifier and filter circuit 13, a first-stage buck circuit and a second-stage buck circuit, wherein the front-stage rectifier and filter circuit 13 is connected to the first-stage buck circuit, the first-stage buck circuit is connected to the switching signal detection circuit 31, the second-stage buck circuit and the relay drive circuit 52, and the first-stage buck circuit implements the first-stage voltage drop of mains supply to a low voltage of 12 V. This low voltage is only supplied to the switching signal detection circuit 31, the second-stage buck circuit and the relay drive circuit 52;

The second-stage buck circuit is connected to the wireless communication circuit 41, and further drops the 12 V voltages generated through the first-stage voltage drop to 3.3 V, which is then supplied to the wireless communication circuit 41.

Specifically, a fuse 2F2 in the circuit principle diagram provides current-limiting protection to prevent a short circuit; and the resistor 2R15 provides overvoltage protection for the elements of the AC32-DC14 circuit, and a rectifier bridge 2D7, a capacitor 2C15, an inductor 2L2, and a capacitor 2C16 constitute the front-stage rectifier and filter circuit 13.

Figure 14:
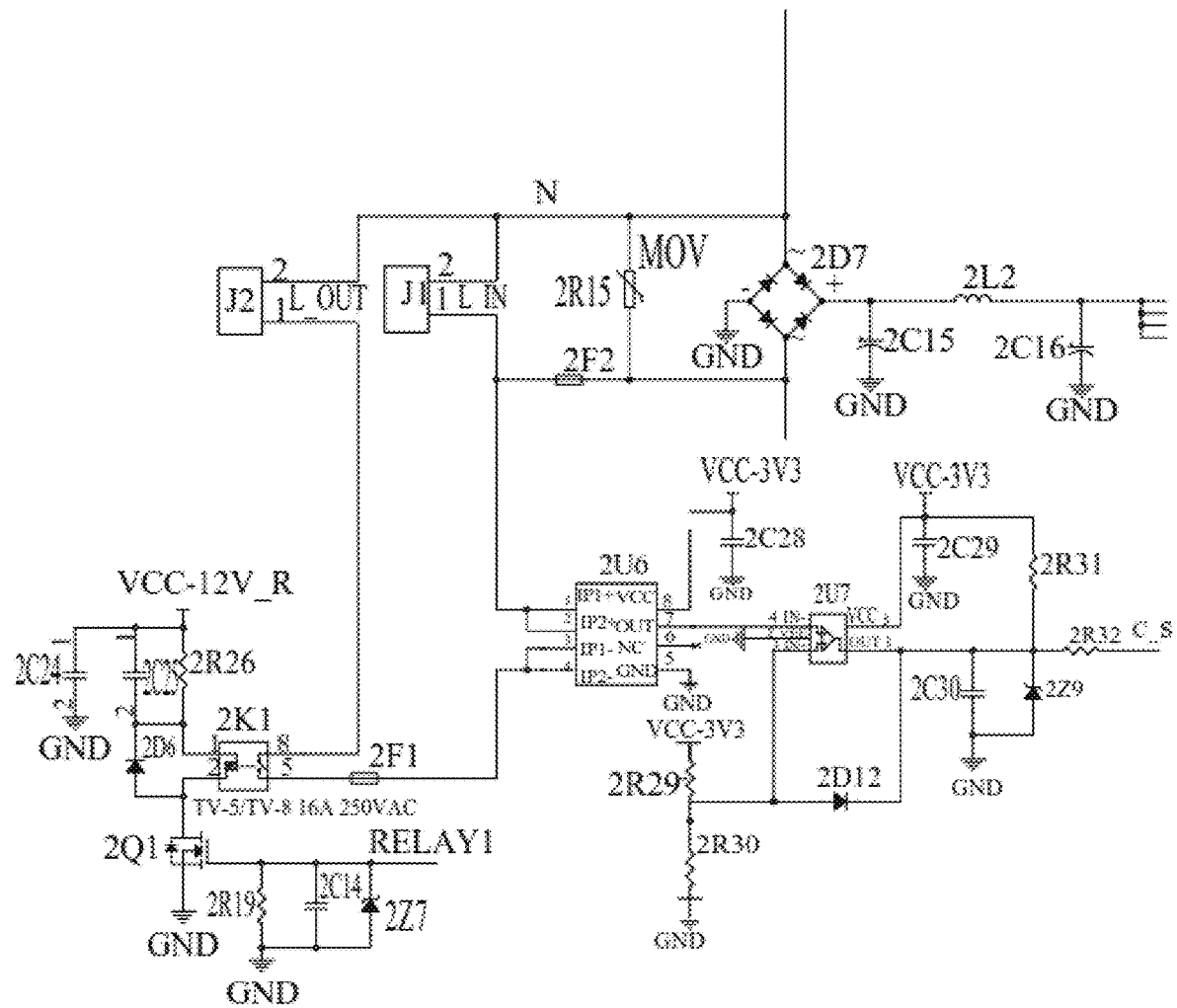
FIG. 14 is a circuit principle diagram of a delay control circuit in an split-type in-wall smart switch module according to the present invention.

As shown in FIG. 14: 2K1, as a relay in the relay circuit 51, is a terminal device for final execution of a panel switching signal and a wireless control signal, and is used to control the turning-on and turning-off of the load 6.

A capacitor 2C24, a capacitor 2C25, a resistor 2R26, a diode 2D6, a switching tube 2Q1, a resistor 2R19, a capacitor 2C14 and a diode 2Z7 constitute the relay drive circuit 52, which drives the relay to be switched on and switched off through a RELAY1 signal. The RELAY1 signal comes from the I/O port of the wireless module controller connected to the wireless communication circuit 41.

Further, there is also provided an overcurrent protection circuit composed of a fuse 2F1, a chip 2U6, a capacitor 2C28, a chip 2U7, a resistor 2R29, a resistor 2R30, a diode 2D12, a capacitor 2C30, a diode 2Z9, a capacitor 2C29, a resistor 2R31, and a resistor 2R32. When the load 6 fails under overcurrent or short-circuit, the overcurrent protection circuit can provide timely protection to avoid risks such as circuit burnout and fire, and output an overcurrent signal to C_S, wherein the C_S is connected to the I/O port of the wireless module controller connected to the wireless communication circuit 41.

Figure 15:
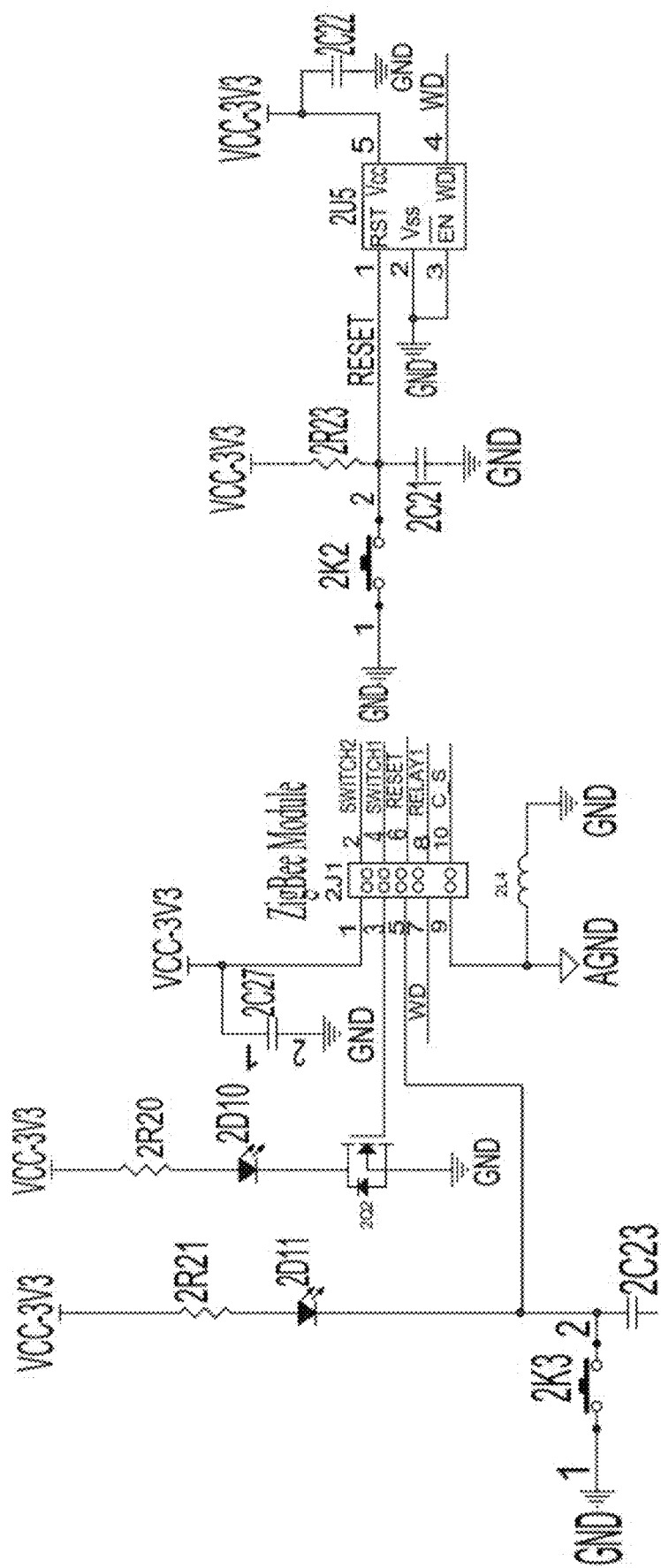
FIG. 15 is a circuit principle diagram of a wireless module unit in a split-type in-wall smart switch module according to the present invention.

As shown in FIG. 15: the LED indicator circuit 42 is composed of a resistor 2R21, a diode 2D11, a switch 2K3, a capacitor 2C23, a resistor 2R20, a diode 2D10 and a switching tube 2Q2, and indicates the operating state of a wireless communication module.

The wireless communication circuit 41 comprises a Zigbee Module 2J1 and an inductor 2L4 which are connected to a wireless module, wherein the wireless module may be a Zigbee wireless module, and the inductor 2L4 functions to isolate interference.

The wireless communication circuit 41 also comprises a reset circuit composed of a switch 2K2, a resistor 2R23, a capacitor 2C21, a chip 2U5 and a capacitor 2C22, which is configured to automatically reset the wireless module unit 4 under abnormal conditions.

Process for the mechanical switch 2: a panel of the mechanical switch 2 is pressed to generate a switching signal and the switching signal is transmitted to the switching signal generation unit 1. The switching signal generation unit 1 transmits the signal to a switching signal acquisition and processing circuit. The switching signal acquisition circuit parses the switching signal and forwards it to a wireless control circuit, and then the wireless control circuit controls the switching circuit to turn on or turn off the lamp.

The panel switch is independent from the wireless control of the mechanical switch 2, without any conflict and interference. For example, after the lamp is turned off by means of the panel of the mechanical switch 2, it can be controlled to be turned on and turned off in a wireless manner; and after the lamp is controlled to be turned off in a wireless manner, it can also be turned on and turned off by means of the panel of the mechanical switch 2.

The panel of the mechanical switch 2 is configured to input a switching signal, and supports rocker switches and rebound switches. The lamp can be turned on and turned off by pressing the mechanical switch 2. In similar to a traditional mechanical switch 2, the effect of completely isolated turning-on and turning-off can be realized, which means that, when power is off, there is no voltage at the load 6, and the load is completely disconnected. However, slight electricity leakage may occur with the existing in-wall switches with no neutral wire currently on the market.

The wireless control unit controls the lamp to be turned on and turned off in a wireless communication manner. The turning-on and turning-off in a wireless manner are the same as the turning-on and turning-off under the control of the panel of the mechanical switch 2 above, both of which belong to completely isolated turning-on and turning-off. Supported wireless control types comprise: Zigbee, Z-wave, Wi-Fi, Bluetooth, LoRa, Cellular, etc., without restriction on power consumption. However, the existing in-wall switches with no neutral wire currently on the market only support the control manners of low power consumption, such as Zigbee and Bluetooth, but cannot support the control manners such as Cellular and Wi-Fi.

Moreover, the present application supports various bulbs of a low power. However, the existing in-wall switches with no neutral wire currently on the market only support bulbs of 3 W or above and cannot realize a switching function when the power is below 3 W.

Finally, it should be noted that the above descriptions are only preferred embodiments of the present invention and are not intended to limit the present invention. Although the present invention has been described in detail with reference to the foregoing embodiments, for those skilled in the art, the technical solutions described in the foregoing embodiments may still be modified or some technical features therein may be equivalently replaced. Any modification, equivalent substitution, improvement, and the like made within the spirit and principle of the present invention shall be included into the scope of protection of the present invention.

What is claimed is:

1. A split-type in-wall smart switch module, comprising a switching signal generation unit, a mechanical switch, a switching signal receiving and processing unit, a wireless module unit, a switching unit and a load, wherein the switching signal generation unit is connected to a live wire in mains electricity, the mechanical switch and the switching signal receiving and processing unit, respectively; the switching signal receiving and processing unit is also connected to the wireless module unit and a neutral wire in mains electricity, respectively; the other end of the wireless module unit is connected to the switching unit; the other end of the switching unit is connected to the load; and the other end of the load is connected to the neutral wire in mains electricity; the switching signal generation unit comprises a bidirectional thyristor, a gate electrode circuit, a rectifier and filter circuit, a DC-DC buck circuit, an optocoupler isolation circuit, an optocoupler relay and a delay circuit, wherein an input end of the bidirectional thyristor is connected to the live wire in mains electricity, and a control end of the bidirectional thyristor is connected to the gate electrode circuit; the gate electrode circuit is also connected to the rectifier and filter circuit and the optocoupler isolation circuit, respectively; the rectifier and filter circuit is connected to the DC-DC buck circuit; the DC-DC buck circuit is connected to the mechanical switch, the delay circuit and an optocoupler circuit, respectively; an output end of the mechanical switch is connected to the delay circuit; an output end of the delay circuit is connected to the optocoupler circuit; and an output end of the optocoupler circuit is connected to the optocoupler isolation circuit.

2. The split-type in-wall smart switch module according to claim 1, further comprising a switching indicator circuit, wherein the switching indicator circuit is connected to the DC-DC buck circuit and the output end of the mechanical switch.

3. The split-type in-wall smart switch module according to claim 1, wherein the switching signal receiving and processing unit comprises a switching signal detection circuit and an AC-DC circuit, the wireless module unit comprises a wireless communication circuit and an LED indicator circuit, and the switching unit comprises a relay circuit and a relay drive circuit, wherein the switching signal detection circuit is connected to an output end of the switching signal generation unit, the neutral wire in mains electricity and the wireless communication circuit, and the AC-DC circuit and the relay circuit are also connected to the output end of the switching signal generation unit and the neutral wire in mains electricity; one end of the load is connected to the relay circuit, and the other end of the load is connected to the neutral wire in mains electricity; the AC-DC circuit is connected to the switching signal detection circuit, the relay drive circuit and the LED indicator circuit, respectively; the wireless communication circuit is connected to the LED indicator circuit and the relay drive circuit, respectively; and the relay drive circuit is connected to and controls the relay circuit.

4. The split-type in-wall smart switch module according to claim 3, wherein the switching signal detection circuit comprises a live wire switching signal detection circuit and a neutral wire switching signal detection circuit which are identical in circuit layout, the live wire switching signal detection circuit comprising a rectifier circuit, a voltage divider circuit, a voltage stabilizer circuit and a comparison circuit, wherein an input end of the comparison circuit is connected to the rectifier circuit, the voltage divider circuit, and the voltage stabilizer circuit, respectively, and an output end of the comparison circuit is connected to the wireless communication circuit.

5. The split-type in-wall smart switch module according to claim 3, wherein the AC-DC circuit comprises a front-stage rectifier and filter circuit, a first-stage buck circuit and a second-stage buck circuit, wherein the front-stage rectifier and filter circuit is connected to the first-stage buck circuit, and the first-stage buck circuit is connected to the switching signal detection circuit, the second-stage buck circuit and the relay drive circuit; and the second-stage buck circuit is connected to the wireless communication circuit.

6. The split-type in-wall smart switch module according to claim 1, wherein the switching signal generation unit and the mechanical switch are arranged in an electrical box under a switch panel, and the switching signal receiving and processing unit, the wireless module unit and the switching unit are arranged at the load.

7. The split-type in-wall smart switch module according to claim 1, wherein the optocoupler isolation circuit comprises a diode 1D1, a diode 1D2, a diode 1Z1, a diode 1Z2, an MOS optocoupler 1U2 and an MOS optocoupler 1U8, wherein the diode 1D1 and the diode 1D2 constitute a rectifier circuit, and the MOS optocoupler 1U2 and the MOS optocoupler 1U8 are connected to the rectifier circuit and a voltage stabilizer circuit.

8. The split-type in-wall smart switch module according to claim 1, wherein the optocoupler relay circuit comprises a switching tube 1Q2 and a switching tube 1Q4, wherein the switching tube 1Q2 controls and drives the MOS optocoupler 1U2, and the switching tube 1Q4 controls and drives the MOS optocoupler 1U8.

9. The split-type in-wall smart switch module according to claim 8, wherein the delay circuit comprises a diode 1D3, a diode 1D5, a diode 1D6, a resistor 1R2, a resistor 1R4, a resistor 1R5, a capacitor 1C1 and a capacitor 1C2, wherein one end of each of the diode 1D3, the resistor 1R2 and the capacitor 1C1 is connected to a G electrode of the switching tube 1Q2, and the other end of each of the diode 1D3 and the resistor 1R2 is connected to an S electrode of the switching tube 1Q2; one end of each of the diode 1D5, the resistor 1R5 and the capacitor 1C2 is connected to a G electrode of the switching tube 1Q4, and the other end of each of the diode 1D5 and the resistor 1R5 is connected to an S electrode of the switching tube 1Q4; and the other end of each of the capacitor 1C1 and the capacitor 1C2 is connected to the diode 1D6 and the resistor 1R4.

\* \* \* \* \*